United States Patent Office 3,446,324
Patented May 27, 1969

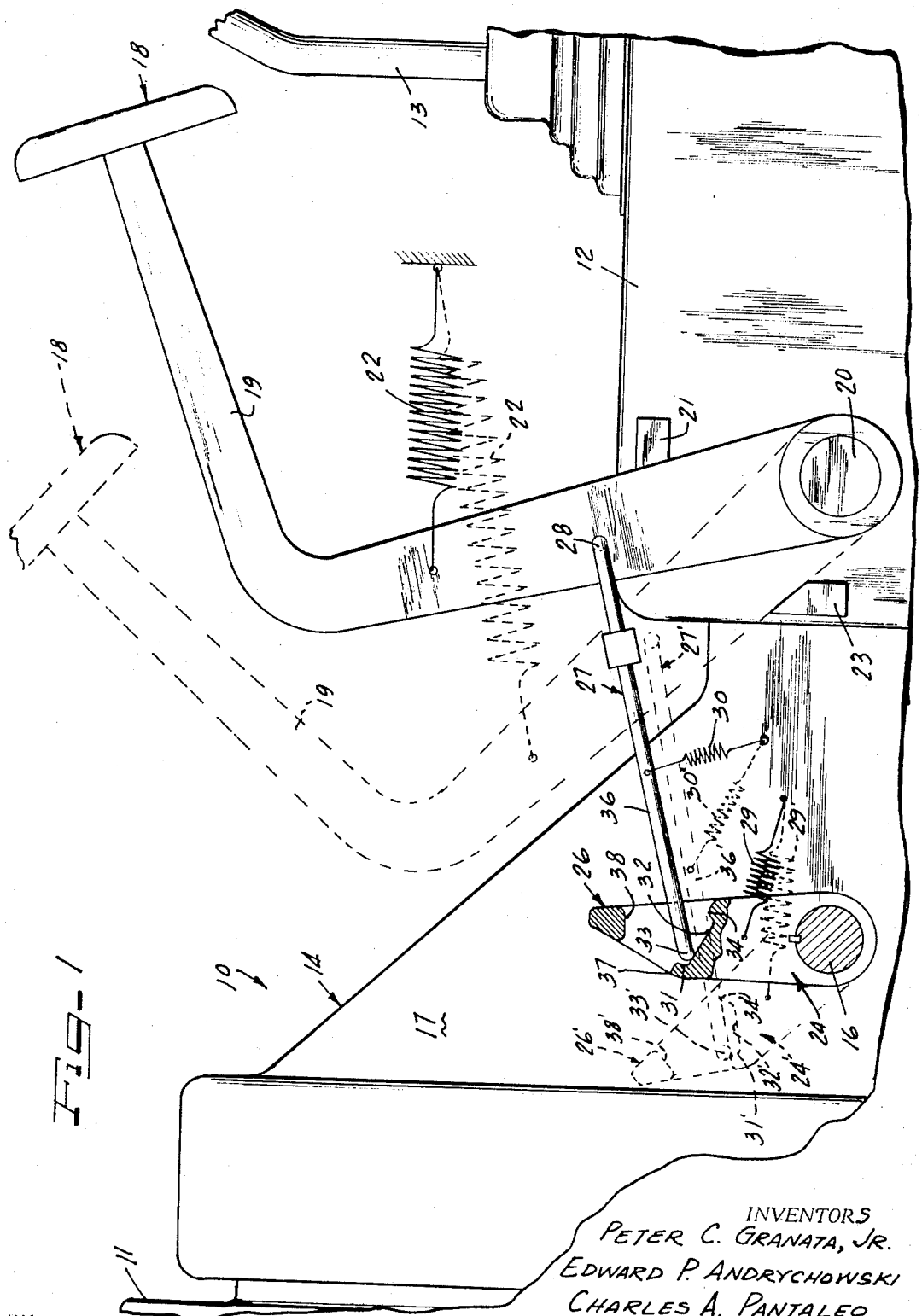

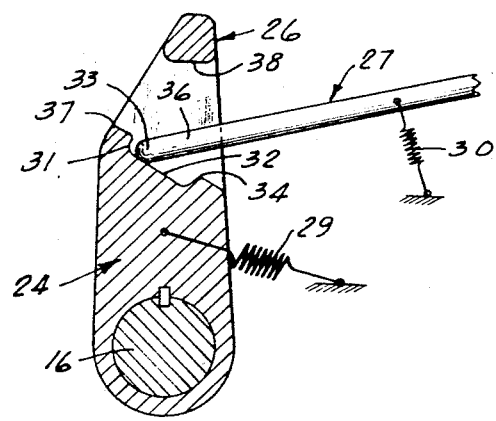
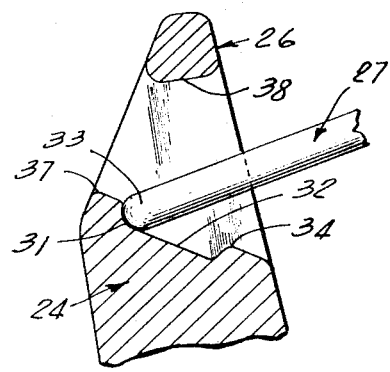
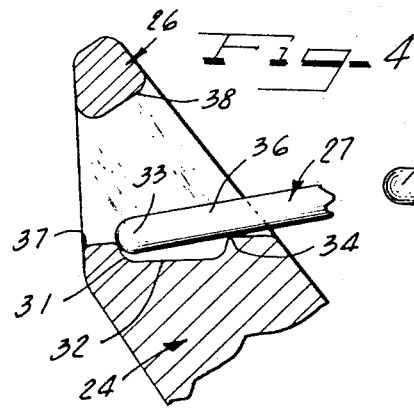
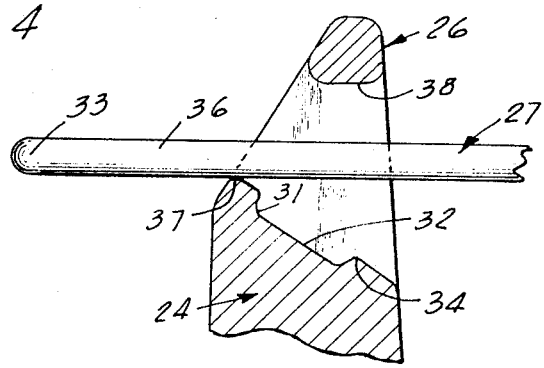
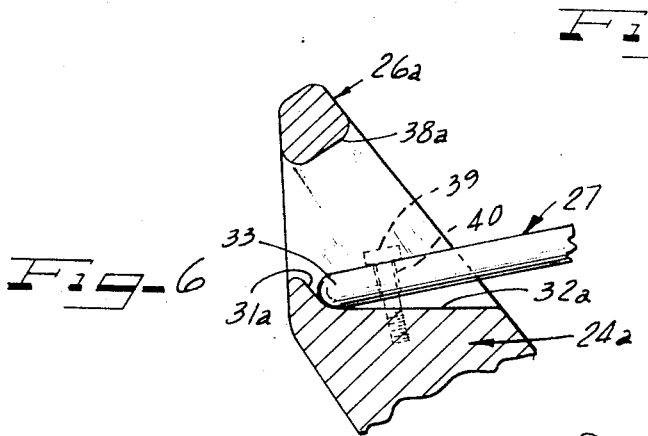

3,446,324
MECHANISM FOR RELEASING AND QUICKLY REENGAGING CLUTCHES
Peter C. Granata, Jr., 1025 S. May St., Chicago, Ill. 60607, Edward P. Andrychowski, 2900 N. Dora St., Franklin Park, Ill. 60131, and Charles A. Pantaleo, 820 S. Carpenter St., Chicago, Ill. 60607
Filed Aug. 2, 1967, Ser. No. 657,835
Int. Cl. F16d *19/00, 21/00, 23/00*
U.S. Cl. 192—99
3 Claims

ABSTRACT OF THE DISCLOSURE

A clutch mechanism for vehicles having a manual gear shift lever including a pivotal clutch shaft biased in one direction for effecting engagement of the clutch plates and pivotal in an opposite direction for disengaging the clutch plates. A clutch pedal is adapted to be pivotally mounted on the vehicle for movement from a released position to a depressed position. The clutch pedal is operatively connected to the clutch shaft by means of an elongated trip rod pivotally connected to the clutch pedal and extending at its free distal end to a trip block fixedly connected to the clutch shaft. In the released position of the clutch pedal the trip rod is biased so that the free end is adjacent an abutment surface or shoulder formed on the trip block. The shoulder extends in a direction which includes a component radially disposed with respect to the axis of rotation of the clutch shaft. As the clutch pedal is depressed a given distance the free end of the trip rod engages the shoulder of the trip block and causes the trip block and the clutch shaft to pivot in one direction sufficiently to disengage the clutch plates. As the clutch pedal is depressed further the free end of the trip rod becomes disengaged with the shoulder and the trip block and clutch shaft are immediately pivotally biased in an opposite direction to engage the clutch plates. Thus as the clutch pedal is depressed fully the clutch plates are first disengaged and then engaged again. The manual gear shift lever is shifted during the period in which the clutch plates are disengaged. When the clutch pedal is released the free end of the trip rod is again biased to a position adjacent the shoulder of the trip block.

Background of the invention

This invention relates generally to vehicular clutch mechanisms and more particularly to a clutch mechanism for use in vehicles having manual gear shift levers. The present invention enables the operator of the vehicle to disengage and engage the clutch plates of the clutch very rapidly and is particularly suitable for use in drag racers or the like vehicles where the time required to shift gears is especially critical.

Drag racing has enjoyed increased popularity in recent years. This type of racing is distinctive in that the test is based on acceleration capabilities as contrasted with other types of auto racing which principally involve prolonged high speed operation.

Drag racers are generally equipped with manual transmissions having, for example, gear combinations capable of four speed ratios which are selectively shifted by means of a manual gear shift lever. A depressible-releasable foot operated clutch pedal is used to operate a clutch of the mechanical type which includes friction clutch plates. The foot pedal is depressed to disengage the clutch plates as the transmission is being shifted from one gear ratio to another and is released to engage the clutch plates after the gears have been shifted.

In competition drag racing the skill of the competing drivers in rapidly depressing the clutch pedal, shifting gears and releasing the clutch pedal is in some not insubstantial degree determinitative of the winner. Accordingly the drivers strive to develop the muscle coordination and split-second timing which is required to shift gears expertly.

In the course of shifting gears one physical time-consuming act involves releasing the clutch pedal after the pedal has been depressed and the gears shifted. The time that is required to release the foot pedal and reinstitute acceleration may be in the order of $1/5$ to $1/20$ of a second in the case of competition drivers. In the aggregate this time period is multiplied three or four times depending upon the number of gear ratios of the transmission and thus the number of times during the course of a race that the gears are shifted. While time periods of this magnitude are inconsequential in ordinary driving conditions they constitute a significant portion of the overall racing time of a drag race in which acceleration is paramount. It thus behooves the devotee to discover if possible a manner and means of reducing this time period and it is to this end the present invention is directed.

Summary of the invention

The present invention may be briefly summarized as comprising a clutch mechanism having a rotatable or pivotal clutch shaft movable in one direction to disengage a pair of clutch plates and biased in an opposite direction to engage the clutch plates, a foot pedal movable to a fully depressed position and biased to a releasable position and a releasable connection for operatively interconnecting the foot pedal and the clutch shaft for rotating the shaft in said one direction for disengaging the clutch plates as the foot pedal is depressed a given distance from the released position, and then for disconnecting the clutch shaft from the foot pedal as the foot pedal is moved to the fully depressed position, whereupon the clutch shaft is biased in said opposite direction for engaging the clutch plates. Thus by moving the foot pedal in one direction from the released to the fully depressed position thereof the clutch plates are first disengaged and then engaged.

The releasable connection between the foot pedal and the clutch shaft comprises a trip rod and a cooperating trip block mounted on the clutch pedal and on the clutch shaft. An abutment surface or shoulder is formed on the trip block and as the foot pedal is moved from the released toward the fully depressed position thereof one end of the trip rod engages the shoulder to rotate the clutch shaft in one direction to disengage the clutch plates. Before the clutch pedal moves to the fully depressed position thereof, however, the abutting end of the trip rod moves out of engagement with the shoulder of the trip block, thus enabling the clutch shaft to be rotationally biased back in the opposite direction to again engage the clutch plates.

In one embodiment of the trip block a boss formed thereon lifts the abutting end of the trip rod off of the shoulder. In another embodiment a reduction in frictional forces between the abutting end of the trip rod and the shoulder as a result of the relative angular disposition therebetween causes the trip rod to slip off to the shoulder.

It is, therefore, an object of the present invention to provide an improved manually operated clutching mechanism for reducing the time period required for disengaging and engaging the clutch plates.

Another object is to provide a clutch mechanism capable of rapid-re-engagement of the clutch plates after they have been disengaged.

Yet another object of the invention is to provide a clutch mechanism for connecting and disconnecting a driving and a driven member and including a manually actuable member movable in opposite directions between two positions wherein the clutch disconnects and connects the driving member and the driven member as the manually actuable member is moved in one direction from one of said positions to the other.

Another object of the invention is to provide a method of and apparatus for reducing the time period required for shifting gears in a vehicle having a manually shiftable transmission.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

*Brief description of the drawing*

FIGURE 1 is a fragmentary elevational view of a vehicular engine drive assembly including a clutch mechanism constructed in accordance with the principles of the present invention mounted between an engine and a transmission having a manually operated gear shift lever.

FIGURE 2 is an enlarged fragmentary vertical sectional view of a trip rod and trip block of the present invention disposed in the position assumed thereby when the foot pedal of the clutch mechanism is released.

FIGURE 3 is similar to FIGURE 2 but shows the relative disposition of the trip rod and trip block after the foot pedal has been depressed slightly.

FIGURE 4 is similar to FIGURE 3 but shows the relative disposition of the trip rod and trip block after the foot pedal has been depressed further and just before the free end of the trip rod is disengaged from the shoulder of the trip block.

FIGURE 5 is similar to FIGURE 4 but shows the position of the trip rod after the foot pedal is fully depressed, the free end of the trip rod has pivoted away from the shoulder and the trip block has returned to the position thereof shown in FIGURE 2.

FIGURE 6 is similar to FIGURE 2 but shows another embodiment of the trip rod and trip block assembly.

*Description of the preferred embodiments*

Although the principles of the present invention are of utility in any clutch mechanism for connecting and disconnecting a driving and a driven member a particularly useful application is made to clutch mechanisms for vehicles having a transmission operated by a manual gear shift lever and an illustrative embodiment herein shown consists of a clutch mechanism of a drag racer.

Indicated generally at reference numeral 10 in FIGURE 1 is a drag racer clutch mechanism coupled between the block of an internal combustion engine 11 and a transmission 12. The gears of the transmission are shifted to change the gear ratio of the transmission 12 by means of a manually operated gear shift lever 13.

The clutch mechanism 10 may be more particularly characterized as comprising a clutch 14 of the mechanical type incorporating the usual clutch plates. A clutch shaft 16 is journalled for pivotal or limited rotational movement on a housing 17 of the clutch 14 and extends into the clutch to engage and disengage the clutch plates. In the embodiment illustrated in FIGURE 1, rotation of the clutch shaft 16 in a counterclockwise direction serves to disengage the clutch plates while rotation in a clockwise direction engages the clutch plates.

Associated with the clutch 14 is a clutch pedal 18 including an arm 19 journalled for rotation on a shaft 20. The arm 19 is biased in a clockwise direction about a shaft 20 having a fixed axis and into abutting engagement with a fixed stop 21 by means of a spring member 22. This position of the foot pedal 18 shown in full lines in FIGURE 1 may be referred to as the "released" position. The pedal may be pivoted in a counterclockwise direction about the shaft 20 by means of foot pressure until the arm 19 abuts another stop 23. The second position of the foot pedal is indicated in broken lines in FIGURE 1 and may be conveniently referred to as the "depressed" position of the pedal.

Keyed to the clutch shaft 16 for joint rotation therewith is an arm 24 having mounted at the end thereof a trip block indicated generally at reference numeral 26. An elongated trip rod 27 which cooperates with the trip block 26 is pivotally connected at one end 28 thereof to the arm 19 of the foot pedal 18. The arm 24 is biased in a clockwise direction about the clutch shaft 16 by means of a spring member 29 and the trip rod 27 is biased in a counterclockwise direction about the pin 28 by a spring member 30. Both spring members 29 and 30 may be securely connected at one end thereof to the clutch housing 17. An adjustment block 27a is mounted on the rod 27 to adjust the length thereof.

In the enlarged view of FIGURE 2 the trip block 26 and the trip rod 27 are shown in the respective positions which they assume in the released position of the clutch pedal 18. The trip block 26 may be more particularly characterized as comprising an abutment surface or shoulder 31 shaped slightly arcuately but extending substantially radially with respect to the axis of rotation of the clutch shaft 16. A guide surface 32 adjacent the abutment surface 31 supports a free or distal end 33 of the trip rod 27 in proximately spaced relation to the abutment surface 31. It will be appreciated that the free end 33 is maintained in abutting engagement with the guide surface 32 as a result of the bias of the spring member 30.

As the foot pedal 18 is depressed slightly the end 33 of the trip rod 27 is moved into abutting engagement with the abutment surface 31 of the trip rod 26 and moves the trip block to the position thereof shown in FIGURE 3 with a corresponding counterclockwise rotation of the clutch shaft 16. In this position of the trip block 26 the free end 33 of the trip rod 27 is still in engagement with the abutment surface 31 and the clutch plates of the clutch 14 moves slightly away from one another.

Upon further movement of the foot pedal 18 in the direction of the depressed position thereof the trip rod 27 moves the trip block 26 to the position thereof shown in FIGURE 4. The clutch shaft 16 has now been rotated about 45° or more and the clutch plates of the clutch 14 are completely disengaged with one another.

The free end 33 of the trip rod 27, however, has moved radially outwardly with respect to the shoulder 31 and is about to be pivoted completely out of engagement with the shoulder by a boss or cam surface 34 formed on the trip block 26 adjacent the guide surface 32. The position of the trip block 26 shown in FIGURE 4 is the same position thereof shown in the broken lines of FIGURE 1 indicated at reference numeral 24'.

After the foot pedal 18 is moved slightly beyond the position thereof corresponding to FIGURE 4, further rotation of the trip block 26 about the clutch shaft 16 has the effect of moving the boss 34 sufficiently to push the free end 33 of the trip rod 27 out of engagement with the shoulder 31, whereupon the trip block 26 and the clutch shaft 16 are immediately biased in a clockwise direction back to the positions thereof shown in FIGURE 2 and in the broken lines indicated at reference numerals 26' and 16' in FIGURE 1, at which positions the clutch plates of the clutch 14 are once again engaged.

Such clockwise movement of the trip block 26 has the effect of pivoting the trip rod 27 slightly in a clockwise direction with respect to the pin 28 such that a shank 36 of the rod 27 abuttingly engages an arcuate wall 37 of the trip block 26. This clockwise rotation of the trip rod 27 is accommodated by means of an aperture 38 formed in the trip block 26 through which the trip rod 27 can easily extend.

As the foot pressure is released from the foot pedal 18 enabling the foot pedal to return to the released position thereof shown in FIGURE 1 the trip rod 27 is moved with the foot pedal 18, and as the free end 33 thereof moves back beyond the shoulder 31 the spring member 30 pivots the free end 33 once again into abutting engagement with the guide surface 32.

Another embodiment of the trip block is indicated at reference character 26a in FIGURE 6. This embodiment is similar to the embodiment of the trip block 26 shown in FIGURES 1–5 but instead of employing a boss or cam surface as indicated at 31 in the other figures, the shoulder indicated at reference numeral 31a is constructed and arranged with respect to the trip rod 27 so that the free end 33 of the trip rod merely slides off of the shoulder 31a after the trip block 26 has been rotated in a counterclockwise direction sufficiently to disengage the clutch plates of the clutch 14. It will be apparent that the angle between the axis of the trip rod 27 and the arm 24 and the angle of the shoulder 31a must be selected so that the frictional forces between the free end 33 of the trip rod 27 and the shoulder 31a are sufficient to maintain abutting relation therebetween until the clutch shaft 16 has been rotated sufficiently to completely disengage the clutch plates of the clutch 14.

Operation of the clutch mechanism 10 in association with the transmission 12 may be described as follows. First the foot pedal 18 is urged in the direction of the depressed position thereof a distance sufficient to disengage the clutch plates of the clutch 14. The corresponding position of the trip block 24 and the trip rod 27 is shown, for example, in FIGURE 4. Then the manual transmission lever 13 is operated to shift the gears of the transmission into first speed.

Thereafter, when the driver of the drag racer kicks the foot pedal 18 down to the fully depressed position thereof, the clutch shaft 16 immediately pivots in a clockwise direction to immediately engage the clutch plates of the clutch 14. Simultaneously, of course, the driver depresses an accelerator pedal to increase the speed of the engine 11. As soon as the clutch plates of the clutch 14 are engaged, the driver allows the foot pedal 18 to move to the released position in preparation for the next shift of the gears of the transmission.

A slight pressure on the gear shift lever in the direction of the next succeeding position thereof is maintained by the driver and as soon as the racer has attained optimum speed the driver again depresses the foot pedal 18. As soon as the clutch plates have become disengaged the lever 13 shifts to the next gear shift position, and immediately thereafter the clutch plates are engaged with one another. The operation of the foot pedal 18 and the gear shift lever 13 continues in this manner until the transmission has been shifted to its final gear ratio.

It will be appreciated that coordination and timing on the part of the driver are highly desirable in the operation of the clutch 10 and in the shifting of the gears but the present invention enables a skillful drag racer to substantially reduce the time required to shift gears and furthermore provides an almost immediate engagement of the clutch plates after the gears of the transmission have been shifted and the clutch pedal 18 has been fully depressed.

In order to enable the clutch mechanism 10 to be operated in a conventional manner a suitable removable connecting member may be employed to maintain the trip rod 27 and the trip block 26 in connected assembly. Such conventional operation may be desirable, for example, in driving the drag racer to and from the track, and as shown in the dashed lines indicated at reference numeral 39 in the embodiment shown in FIGURE 6, the connecting member may conveniently comprise a bolt extending through oversized bore 40 formed in the trip arm 27 and threaded into the trip block 26 for joint movement of the trip arm and the trip block. The bolt 39 may be easily removed after the drag racer has been driven to the track and before the drag racing has commenced.

Although minor modifications might be suggested by those versed in the art, it should be understood that we wish to embody within the scope of the patent warranted hereon all such modifications as reasonably come within the scope of our contribution to the art.

We claim as our invention:

1. A clutch mechanism for a motor vehicle comprising
  a clutch having a shaft rotatable about a first axis between engaged and disengaged positions thereof.
  means biasing said clutch shaft toward said engaged position thereof,
  a clutch pedal movable in opposite directions between first and second positions about a second axis spaced from said first axis, and
  means for operatively releasably interconnecting the clutch pedal and the clutch shaft comprising
    a rotatable trip block connected for joint rotation with said clutch shaft and including a shoulder extending radially with respect to the axis of rotation of said trip block,
    a trip rod pivotally mounted at one end thereof on said clutch pedal and extending at an opposite free end thereof to said trip block,
    spring means pivotally biasing said free end of said trip rod toward said trip block,
    said free end of said rod being disposed at varying angles, with respect to said shoulder, so as to frictionally drivingly engage said shoulder to rotate said clutch shaft to the disengaged position thereof as said clutch pedal moves from said first position to a position intermediate said first and second positions, so as to slip or slide out of driving engagement with said shoulder as said clutch pedal continues to move from said intermediate position in the direction of said second position and as said shoulder continues to rotate about the axis of rotation of said trip block to enable said clutch shaft biasing means to rotate said clutch shaft back to the engaged position thereof.

2. The clutch mechanism as defined in claim 1 wherein said trip block further comprises a guide surface having a tangential component with respect to the axis of said trip block for supporting said free end of said trip rod in position adjacent said shoulder in said first position of said clutch pedal.

3. The clutch mechanism as defined in claim 1 wherein the respective biasing forces of said clutch shaft biasing means and said trip rod biasing means are such as to enable said clutch shaft to return to said engaged position thereof after the free end of said trip rod has slipped out of driving engagement with said shoulder.

References Cited

UNITED STATES PATENTS

| | | | |
|---|---|---|---|
| 1,634,983 | 7/1927 | Cotterill | 192—99 |
| 1,703,788 | 2/1929 | Skinner | 192—89 |
| 1,714,320 | 5/1929 | Seward | 192—89 |
| 2,319,123 | 5/1943 | Gamble | 192—99 |

BENJAMIN W. WYCHE III, *Primary Examiner.*

U.S. Cl. X.R.

74—512; 192—3.5